United States Patent [19]
Ito et al.

[11] Patent Number: 5,722,065
[45] Date of Patent: Feb. 24, 1998

[54] MOBILE COMMUNICATIONS SYSTEM AND MOBILE RECEIVER

[75] Inventors: Shogo Ito, Yokohama; Yasushi Yamao, Yokosuka, both of Japan

[73] Assignee: NTT Mobile Communications Network, Inc., Tokyo, Japan

[21] Appl. No.: 392,990
[22] PCT Filed: Aug. 26, 1994
[86] PCT No.: PCT/JP94/01413
  § 371 Date: May 25, 1995
  § 102(e) Date: May 25, 1995
[87] PCT Pub. No.: WO95/06393
  PCT Pub. Date: Mar. 2, 1995

[30] Foreign Application Priority Data

Aug. 27, 1993 [JP] Japan .................... 5-213045

[51] Int. Cl.$^6$ ............... H04B 7/00; H04Q 3/02; H04Q 9/14
[52] U.S. Cl. ........................... 455/38.3; 455/343
[58] Field of Search ................. 455/38.1, 38.3, 455/343; 340/825.22, 825.44, 825.47; 370/311, 337, 347

[56] References Cited

U.S. PATENT DOCUMENTS

| | | | |
|---|---|---|---|
| 4,449,248 | 5/1984 | Leslie et al. | 455/343 |
| 4,745,408 | 5/1988 | Nagata et al. | 455/343 |
| 4,961,073 | 10/1990 | Drapac et al. | 455/38.3 |
| 5,025,251 | 6/1991 | Mittel et al. | 455/343 |
| 5,227,777 | 7/1993 | Sato et al. | 455/343 |
| 5,241,542 | 8/1993 | Natarajan et al. | 455/54.1 |
| 5,301,225 | 4/1994 | Suzuki et al. | 455/343 |
| 5,369,799 | 11/1994 | Tsunoda | 455/38.3 |
| 5,392,287 | 2/1995 | Tiedemann, Jr. et al. | 455/343 |

FOREIGN PATENT DOCUMENTS

| | | |
|---|---|---|
| 63-199526 | 8/1988 | Japan . |
| 1265732 | 10/1989 | Japan . |

*Primary Examiner*—Chi H. Pham
*Assistant Examiner*—Gertrude Arthur
*Attorney, Agent, or Firm*—Cushman, Darby & Cushman IP Group of Pillsbury Madison & Sutro LLP

[57] ABSTRACT

Battery saving is achieved by not receiving subframes which do not need to be received. Information regarding the time interval during which unnecessary subframes will be transmitted is inserted in a significant subframe which the base station transmits prior to this time interval, thereby notifying the radio paging receivers. The radio paging receivers detect these notification signals and stop receiving during the time interval when subframes which do not need to be received are transmitted.

10 Claims, 6 Drawing Sheets

Prior Art

MOBILE COMMUNICATIONS SYSTEM AND MOBILE RECEIVER

TECHNICAL FIELD

This invention relates to the constitution of the paging signal sequences sent to mobiles in a mobile communications system, and to the constitution of the mobiles. It relates in particular to a battery saving technique for mobiles. This invention can be utilized not only in the radio paging system described in the embodiments, but also in general mobile communications systems in which mobile units receive, on the basis of intermittent receiving, paging signals that have been transmitted from a base station.

BACKGROUND TECHNOLOGY

A prior art example will be explained with reference to FIG. 4 and FIG. 5. FIG. 4 shows the overall constitution of a radio paging system, while FIG. 5 shows the format of the paging signal sequences used in said radio paging system. In a conventional radio paging system, as shown in FIG. 4, radio waves comprising modulated paging signal sequences are transmitted from base station 1 as a result of call requests from telephone terminal equipment 5 connected to telephone network 4, whereupon radio paging receivers 2 which have received these radio waves are paged.

As shown in FIG. 5(a), the paging signal sequences transmitted from base station 1 comprise n subframes F1–Fn, while, as shown in FIG. 5(b), the signal corresponding to each subframe Fi consists of k paging signals S1–Sk. Paging signals S1–Sk respectively comprise address signals A1i–Aki which are subscriber ID signals, plus message signals M1i–Mki which follow said address signals.

Radio paging receivers 2 are capable of receiving only in one or more assigned subframes F, and receive each of the signals in this or these subframes F. FIG. 5(c) shows the receiving state of a radio paging receiver to which subframe Fi has been assigned. When an address signal A1i–Aki in the received signal matches the address number Aki of radio paging receiver 2 to which subframe Fi has been assigned, a ringing tone is emitted by the radio paging receiver 2 in question, and message signal Mki which immediately follows this address signal Aki is displayed on the liquid crystal display (LCD). A system in which radio paging receiver 2 becomes capable of receiving only during the one or more subframes F which have been assigned to said radio paging receiver is called intermittent reception, and achieves extended battery life by utilizing the fact that most of the time, receiving is unnecessary because paging signals S1–Sk directed at radio paging receivers 2 are usually transmitted no more than a few times a day.

It may be mentioned that during the night and at other times when the traffic volume of paging signals S1–Sk is small, there will be cases in which a given subframe Fi is not filled with paging signals, and cases in which no paging signals S1–Sk are present in a given subframe Fi.

The state of subframes F1–Fn under such circumstances is shown in FIG. 6, which shows the state of subframes F1–Fn when there is little traffic of paging signals S1–Sk. When a given subframe Fi is not filled with paging signals S1–Sk, termination signals E indicating the end of paging signals S1–Sk within a given subframe Fi are transmitted a plurality of times immediately following paging signal S1 up to the very end of this subframe Fi. If no paging signals S1–Sk are present in a given subframe Fi, then the entirety of said subframe Fi is transmitted as a plurality of termination signals E. Under these circumstances, as shown in FIG. 6(c), a radio paging receiver which has been assigned only subframe Fi becomes capable of receiving only when subframe Fi is being received, and discontinues its receiving operation when a termination signal E has been received. This enables the consumption of power in unnecessary signal reception to be suppressed.

In Japanese Unexamined Patent No.63-199526 there is disclosed an intermittent receiving method wherein the length of the frame to be intermittently received changes in accordance with traffic volume. This method pertains not to radio paging receivers but to telephone equipment, and because the length of the frames transmitted by the base station changes in accordance with traffic volume, the time during which a receiver stops receiving (in order to achieve intermittent reception) will change. This is a technique in which the time during which receiving is to be discontinued is transmitted to receivers from the base station, and it is not a technique in which receiving stops due to there being no information to be transmitted to the mobile station in question, or because there is no call request directed to said mobile station. Instead, in the aforementioned disclosed technique, even when there are no paging signals S1–Sk present in subframe Fi, it is necessary to temporarily start the receiving operation in subframe Fi and to receive a termination signal E. It is therefore always necessary to perform this operation, even when there is no information, and this results in unnecessary consumption of power.

The present invention has been devised in light of this situation. It is an object of this invention to provide a mobile communications system in which subframes that do not need to be received are recognized beforehand, thereby enabling unnecessary consumption of power to be reduced. It is a further object of this invention to provide a mobile receiver for use in this system.

DISCLOSURE OF THE INVENTION

According to a first aspect, this invention is a mobile communications system wherein sequences of paging signals for mobile receivers comprise a plurality of subframes in which paging signals are arranged, and wherein each receiver periodically receives one or more of the aforementioned subframes to which it has been assigned; said mobile communications system being characterised in that when subframes in which no paging signals are present periodically follow one another, the aforementioned paging signal sequence contains signals which give notification of the time interval until transmission of the next subframe containing a paging signal, said notification being given at least before this time interval. These notification signals can also be transmitted within the aforementioned time interval as well.

According to a second aspect, this invention relates to a mobile receiver and is characterised in that it has a means which, when said mobile receiver receives an aforementioned signal which gives notification of the time interval until transmission of the next subframe containing a paging signal, on the basis of this signal stops the receiving operation during said time interval.

According to a third aspect, this invention is a mobile communications system wherein the signals of a given transmission cycle are divided into a plurality of subframes, and wherein there is (a) a base station which transmits paging signal sequences in which paging signals containing an address signal are arranged in these subframes, and (b) mobile receivers which receive these paging signal sequences and recognize calls by detecting that their own address signal is contained in a subframe. This mobile communications system is characterised in that the aforementioned base station has (a) a means which decides that there will be, in the receiving cycle of an aforementioned mobile receiver, a time interval during which subframes containing no paging signals will be transmitted, said decision being based on the fact that there is no call request after transmission of a subframe containing a paging signal; and (b) a means which, when this decision means has decided that there is a time interval during which subframes containing no paging signals will be transmitted, inserts, at least into a subframe containing a paging signal that is transmitted prior to this time interval, signals notifying the aforementioned mobile receiver of this time interval. This mobile communications system is also characterised in that the aforementioned mobile receivers have a means which detects the aforementioned notification signals, and a means which, in accordance with these signals, stops the receiving operation during the aforementioned time interval.

When, after the base station has transmitted a significant subframe containing the currently transmitted paging signal, there will be in the receiving cycle of a radio paging receiver a time interval during which subframes containing no paging signals will be transmitted, an interval signal which gives notification of the time interval until transmission of the next significant subframe is transmitted by being inserted into the significant subframe presently being transmitted. A radio paging receiver which has received this interval signal stops its receiving operation during the time interval in which no paging signal will be present, this having been recognized as a result of this interval signal.

As a result, the radio paging receiver can recognize beforehand subframes which do not need to be received, and can therefore reduce unnecessary power consumption.

OPTIMUM CONFIGURATIONS FOR EMBODYING THE INVENTION

Figure 1:
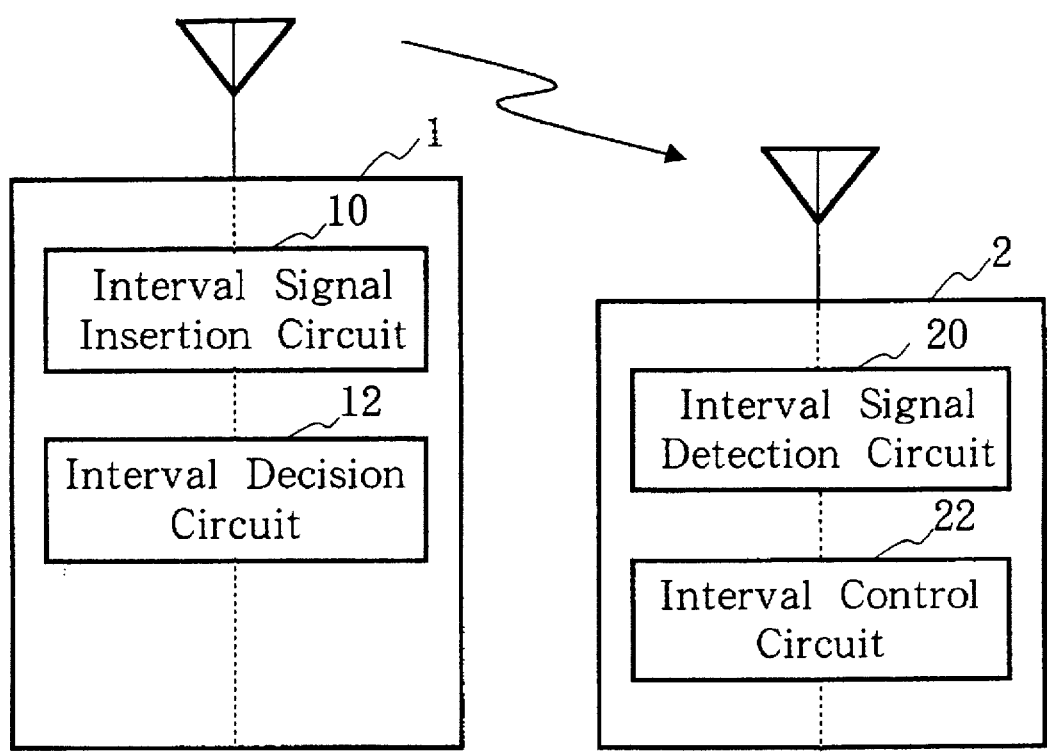
FIG. 1 block diagram of main parts of base station and radio paging receiver used in a first embodiment of this invention.
Figure 2:
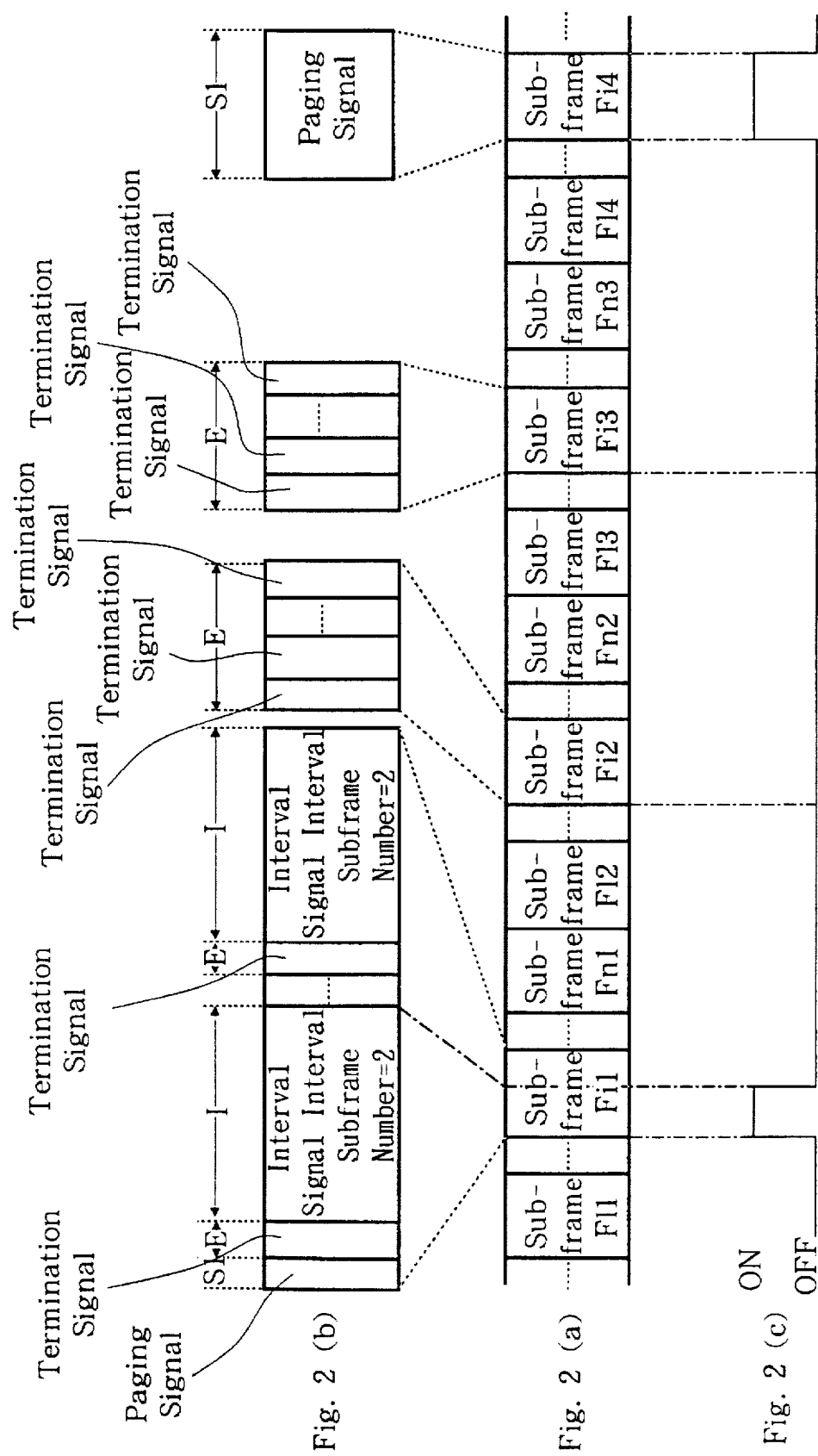
FIG. 2 format of paging signal sequence in the first embodiment of this invention.

A first embodiment of this invention will be explained with reference to FIG. 1 and FIG. 2. FIG. 1 is a block diagram of the main parts of a base station and a radio paging receiver used in said first embodiment. FIG. 2 shows the format of the paging signal sequence in this first embodiment.

This embodiment is a radio paging system in which the signals of a given transmission cycle are divided into a plurality of subframes F11, . . . , Fi1, . . ., Fn1, and which has base station 1 which transmits signals wherein at least one paging signal S1 is arranged in subframe Fi1, said paging signal S1 containing address signal Aki and, following this, message signal Mki. This radio paging system also has radio paging receiver 2 which receives the aforementioned transmitted signals and excites a paging output when it detects that its own address signal Aki is contained in subframe Fi1. Said radio paging receiver 2 to which subframe Fi has been assigned will then display, on its LCD, the message signal Mki which is received immediately after said address signal Aki.

The distinguishing features of this embodiment are that base station 1 has interval decision circuit 12 and interval signal insertion circuit 10, and that radio paging receiver 2 has interval signal detection circuit 20 and interval control circuit 22. The aforementioned interval decision circuit 12 serves as a means which decides that there will be, in the receiving cycle of radio paging receiver 2, a time interval during which subframes Fi2 and Fi3 containing no paging signals S1 will be transmitted, said decision being based on the fact that there is no call request directed to the receiver assigned to subframe Fi1 after transmission of subframe Fi1 containing paging signal S1. The aforementioned interval signal insertion circuit 10 serves as a means which, when this interval decision circuit 12 has decided that there will be a time interval during which subframes containing no paging signals will be transmitted, inserts into subframe Fi1 containing paging signal S1 which is transmitted prior to this time interval, interval signals I which are signals that notify radio paging receiver 2 of this time interval. Interval signal detection circuit 20 serves as a means which detects interval signals I, and interval control circuit 22 serves as a means which, in accordance with these signals, stops the receiving operation during the aforementioned time interval.

As shown in FIG. 2(b), when the base station transmits significant subframe Fi1 containing paging signal S1, and when it will be transmitting, in subsequent transmission cycles, subframes Fi2 and Fi3 which contain no paging signals S1–Sk, said base station transmits in advance, and along with termination signals E of subframe Fi1, interval signals I which give notification of the time interval until transmission of next significant subframe Fi4 which contains paging signals S1–Sk.

In the first embodiment of this invention, because there are two consecutive subframes Fi2 and Fi3 which contain no paging signals S1–Sk, the interval subframe number, which is a parameter of interval signals I, is "2".

When a radio paging receiver has received the termination signal E and interval signal I shown in FIG. 2(b), its receiving operation for subframe Fi1 is stopped before the entire subframe has been received (see FIG. 2(c)). At the same time, the radio paging receiver recognizes, from interval signal I, the time interval involved in subframes Fi2 and Fi3 in which no paging signals S1–Sk are present, and therefore stops its receiving operation during this time interval (see FIG. 2(c)).

Figure 3:
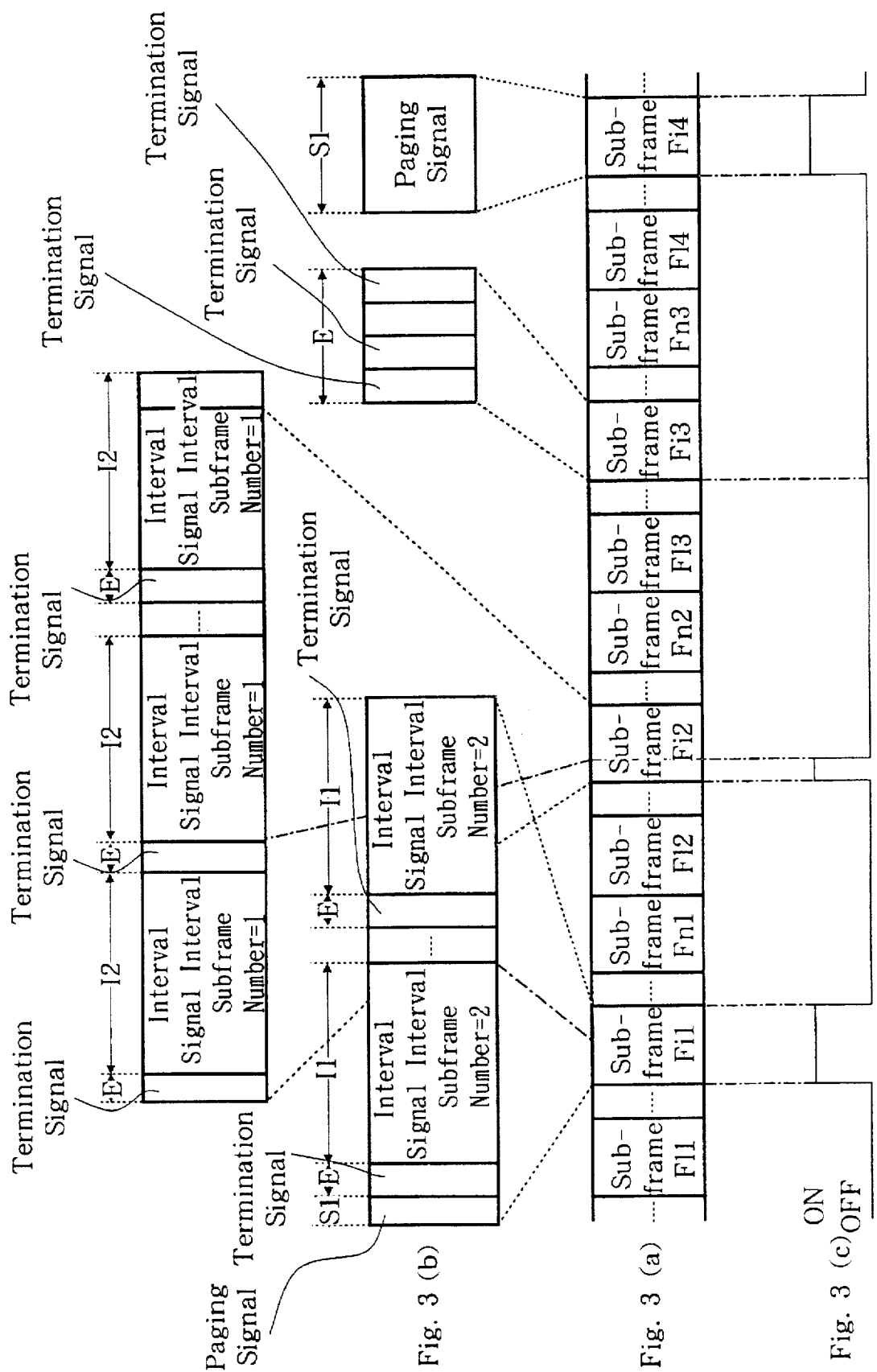
FIG. 3 format of paging signal sequence in a second embodiment of this invention.
Figure 4:
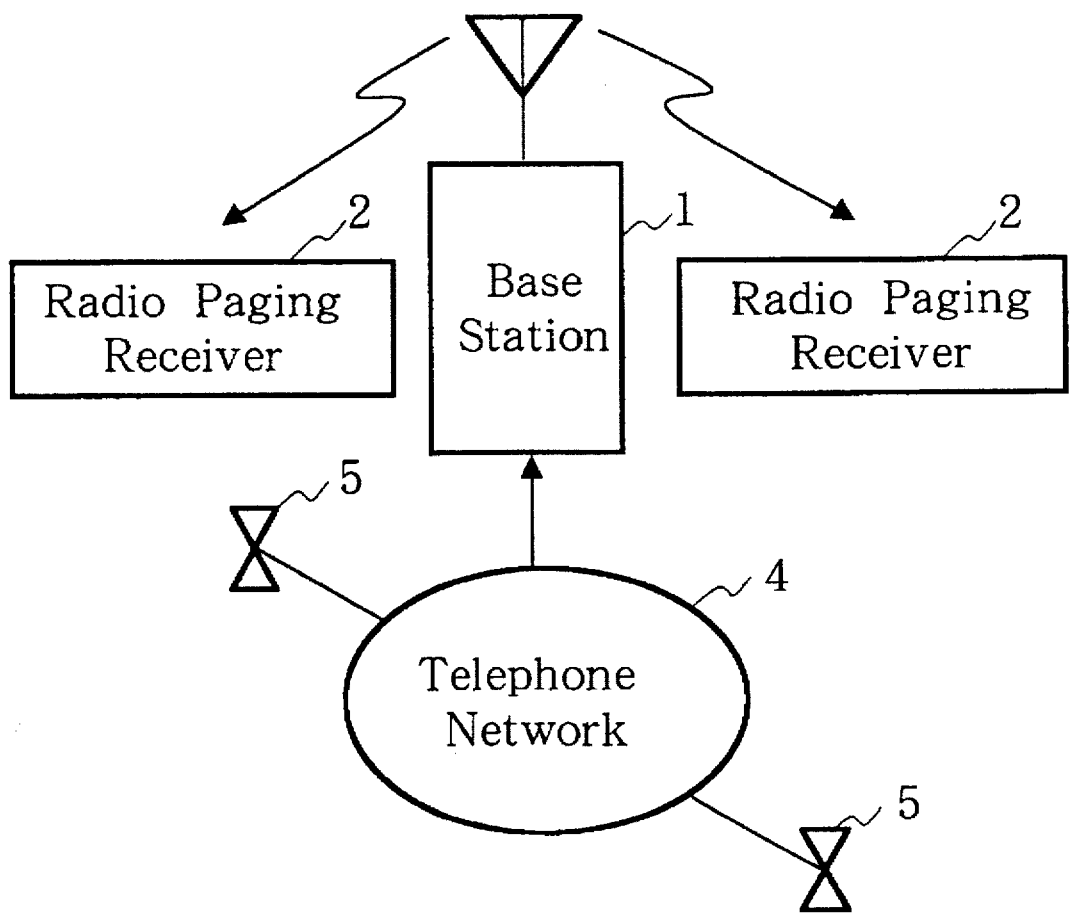
FIG. 4 overall constitution of a radio paging system.
Figure 5:
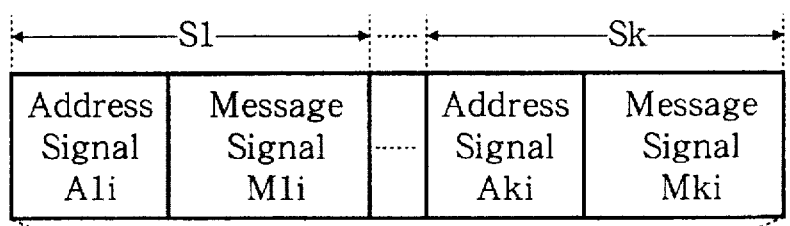
FIG. 5 format of paging signal sequence used in a radio paging system.
Figure 5:
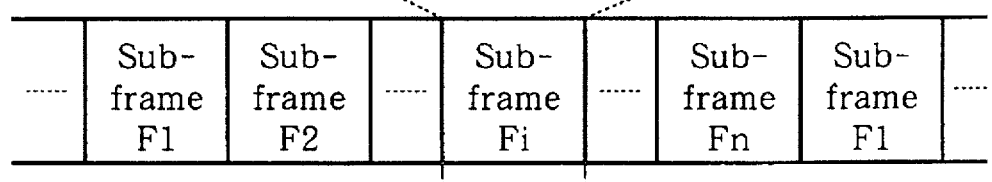
Figure 5:
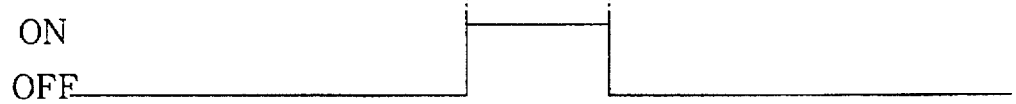
Figure 6:
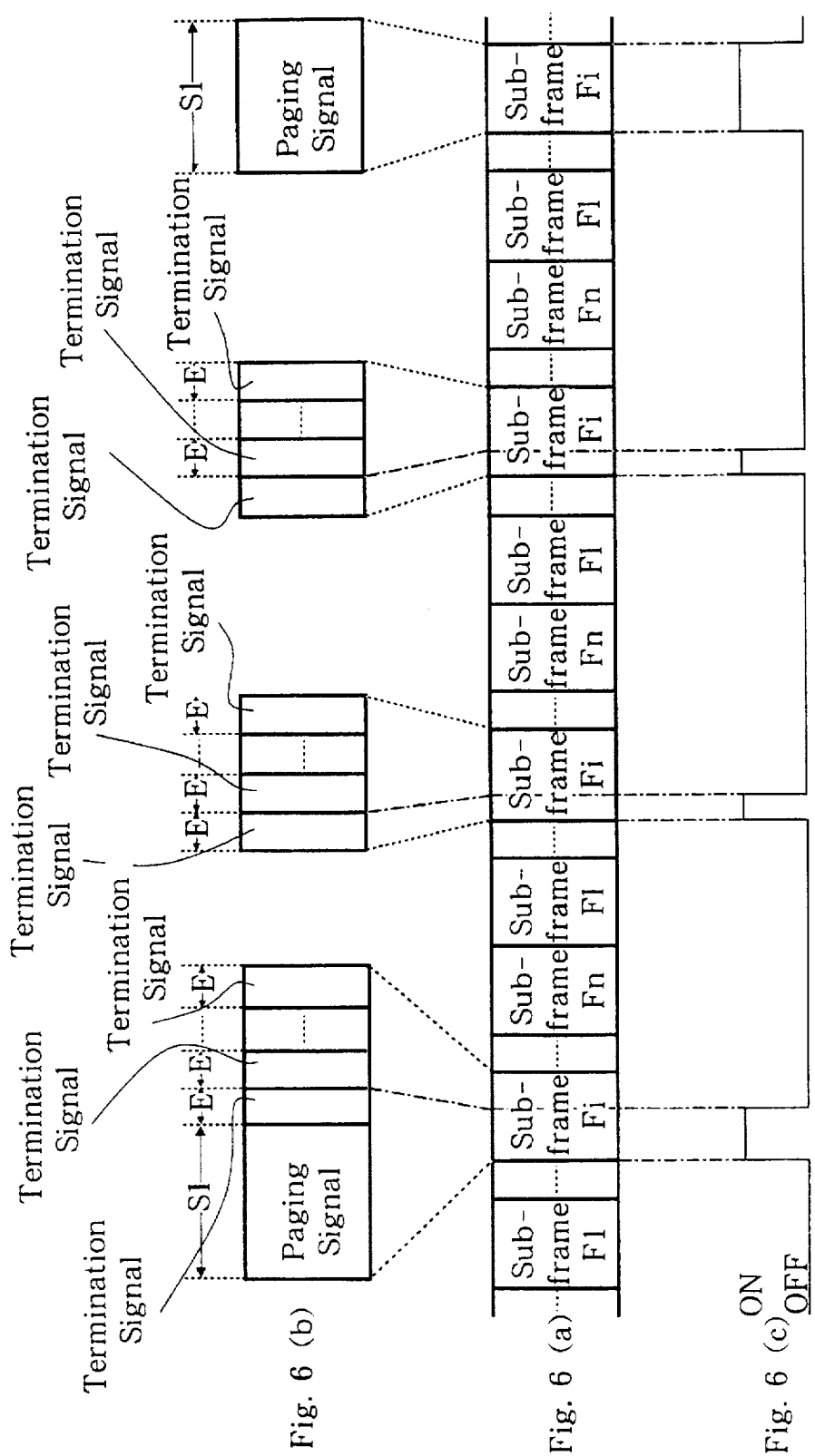
FIG. 6 prior art example of state of subframes when paging signal traffic is slight.

A second embodiment of this invention will now be explained with reference to FIG. 3, which shows the format of paging signal sequences in this second embodiment.

As shown in FIG. 3(b), before the base station transmits subframe Fi2 in which no paging signals are present, it transmits termination signals E, and along with these, interval signals I1 and I2 which give notification of the interval until transmission of next significant subframe Fi4 which has a paging signal. In this second embodiment of the invention, because subframes Fi2 and Fi3 containing no paging signals are consecutive, the interval subframe number that is a parameter of interval signals I1 which are transmitted initially in subframe Fi1 is "2", while the interval subframe number of interval signals I2 which are transmitted in the next subframe Fi2 is "1". There is no need to transmit interval signals in subframe Fi3 which immediately precedes significant subframe Fi4 which has paging signal S1.

When a radio paging receiver has received termination signal E and, following this, interval signal I2 (see FIG. 3(b)), it stops its receiving operation for this subframe Fi2. At the same time, it recognizes, from interval signal I2, the time interval involved in subframe Fi3 in which no paging signals are present, and, as shown in FIG. 3(c), stops its receiving operation for this recognized interval.

In mobile communications, burst errors occur due to shadow fading caused by changes in terrain or natural features in the vicinity of a receiver. As shown in the first embodiment of this invention, if interval signals I have been transmitted in only a single subframe Fi1, circumstances may occur in which interval signals I cannot be received due to such burst errors. Circumstances may therefore arise in which receiving is performed in subframes Fi2 and Fi3 in which no paging signals S1 are present. Therefore, as shown in the second embodiment of this invention, by inserting interval signals I1 and I2 in subframes Fi1 and Fi2 respectively, the latter subframe not containing any paging signals S1, interval signals I1 and I2 will be transmitted a plurality of times with a gap between successive transmissions, with the result that transmission quality can be improved.

FIG. 3(c) shows the case where interval signals I1 with an interval subframe number of "2" cannot be received due to an aforementioned burst error, etc. If subframe Fi1 were received without error, it would be possible to stop the receiving operation in subframe Fi2. Even if interval signals I1 with an interval subframe number of "2" cannot be received, the next interval signal I2, which has an interval subframe number of "1", can be received, and it is therefore possible to avoid carrying out the receiving operation in subsequent subframe Fi3 containing no paging signal.

In the first and second embodiments of this invention, in order to make the explanation easy to understand, the definitions employed distinguished between interval signals I, I1 and I2 on the one hand, and termination signals E on the other. However, it is also possible for these interval signals I, I1 and I2 to be contained in the termination signals E.

It also goes without saying that although the foregoing embodiments were explained using examples from a radio paging system, this invention can also be embodied in other mobile communications systems in which a mobile unit intermittently receives subframes assigned to it and recognizes that there has been a call by identifying its own address signal.

As has now been explained, this invention enables subframes which do not need to be received to be recognized in advance, and can therefore reduce unnecessary power consumption.

Although in the foregoing examples the interval signals were inserted immediately following the termination signals, these interval signals can be present in any place within a subframe. For example, they can also be inserted before the paging signal. When there is a synchronization signal in the header of the subframes, the interval signals can be inserted after this synchronization signal.

Furthermore, although in the foregoing examples the message signals directly followed the corresponding address signals, the invention is not restricted to this, and the following format is also feasible: namely, address signals may be brought together in an address field within the subframe, and message signals may likewise be brought together in a message field within the subframe.

We claim:

1. A method of transmitting and providing for battery efficient reception of a paging signal, comprising the steps of:

inserting a single empty interval signal into a first paging signal subframe of a frame wherein at least one additional paging signal subframe in said frame containing no paging signal follows said first paging signal subframe, said single empty interval signal including an identity of a time interval from said first paging signal subframe until a next transmission of a paging signal subframe of said frame containing a subsequent paging signal; and receiving at a mobile receiver said paging signal subframe containing said empty interval signal assigned to said mobile receiver; and powering down said mobile receiver during said time interval.

2. A mobile communications system comprising:

a base station having a transmitter to transmit a plurality of paging signal subframes in a frame, said base station inserting a single empty interval signal into a first one of said plurality of paging signal subframes when at least a second one of said plurality of paging signal subframes following said first one of said plurality of paging signal subframes contains no paging signal, said single empty interval signal including an identity of a time interval from said first one of said plurality of paging signal subframes until a transmission of a first subsequent one of said plurality of paging signal subframes containing a paging signal; and a mobile receiver to receive said paging signal assigned to said mobile receiver.

3. A mobile communications system according to claim 2, wherein:

said base station transmits said empty interval signal both prior to said time interval and again during said time interval.

4. A mobile communications system according to claim 2, wherein said mobile receiver comprises:

stopping means for stopping a receiving operation of said mobile receiver during a stopping time period corresponding to said time interval in said frame when said mobile receiver receives said single empty interval signal.

5. A mobile communications system comprising:

a base station to transmit a paging signal, said base station comprising:

a transmitter for transmitting a plurality of paging signal subframes in a frame, said paging signal and an address therefore corresponding to a mobile receiver to receive said paging signal, being arranged within one of said plurality of paging signal subframes;

deciding means for deciding whether a receiving cycle of a mobile receiver will include a time interval during which at least one of said plurality of paging signal subframes contain no paging signal after transmission of a first paging signal subframe including said paging signal;

notification insertion means for inserting a single empty interval signal including an identity of said time interval into only one of said plurality of paging signal subframes;

said mobile receiver comprising:

a receiver;

detecting means for detecting said paging signal;

empty time interval detecting means for detecting said single empty interval signal; and stopping means for stopping a receiving operation of said receiver during said time interval corresponding to at least one paging signal subframe.

6. A mobile communications system according to claim 5, wherein:

said notification insertion means also inserts said empty interval signal into at least one of said plurality of paging signal subframes transmitted during said time interval.

7. A mobile communications base station to transmit a paging signal, said base station comprising:

a transmitter for transmitting a plurality of paging signal subframes in a frame, said paging signal and an address therefore corresponding to a mobile receiver to receive said paging signal, being arranged within one of said plurality of paging signal subframes;

deciding means for deciding whether a receiving cycle of a mobile receiver will include a time interval during which at least two of said plurality of paging signal subframes contain no paging signal after transmission of a first paging signal subframe including said paging signal;

notification insertion means for inserting a single empty interval signal including an identity of said time interval into only one of said plurality of paging signal subframes.

8. A mobile communications receiver comprising:

a receiver;

detecting means for detecting a paging signal;

empty time interval detecting means for detecting a single empty interval signal, said single empty interval signal having an identity of a time interval during which at least two of a plurality of paging signal subframes contain no paging signal after transmission of a first paging signal subframe including said paging signal; and stopping means for stopping a receiving operation of said receiver during said time interval corresponding to at least two paging signal subframes.

9. A mobile communications base station to transmit a paging signal, said base station comprising:

a transmitter for transmitting a plurality of paging signal subframes in a frame, said paging signal and an address therefore corresponding to a mobile receiver to receive said paging signal, being arranged within one of said plurality of paging signal subframes;

deciding means for deciding whether a receiving cycle of a mobile receiver will include a time interval during which at least one of said plurality of paging signal subframes contains no paging signal after transmission of a first paging signal subframe including said paging signal; notification insertion means for inserting a single empty interval signal including an identity of said time interval into only one of said plurality of paging signal subframes.

10. A mobile communications receiver comprising:

a receiver;

detecting means for detecting a paging signal;

empty time interval detecting means for detecting a single empty interval signal, said single empty interval signal having an identity of a time interval during which at least one of a plurality of paging signal subframes contains no paging signal after transmission of a first paging signal subframe including said paging signal; and stopping means for stopping a receiving operation of said receiver during said time interval corresponding to at least one paging signal subframe.

* * * * *